UNITED STATES PATENT OFFICE.

MORDUCH L. KAPLAN, OF BROOKLYN, NEW YORK.

GALVANIC CELL.

1,293,463.  Specification of Letters Patent.  Patented Feb. 4, 1919.

No Drawing.  Application filed July 11, 1918.  Serial No. 244,440.

*To all whom it may concern:*

Be it known that I, MORDUCH L. KAPLAN, a citizen of the United States, and a resident of Brooklyn, in the county of Kings and State of New York, have invented certain new and useful Improvements in Galvanic Cells, of which the following is a specification.

The present invention relates to the galvanic cell of the Le Clanché type, which as it is well known, uses manganese peroxid in some form or other as a depolarizer. The different forms of this substance recommended for use in cells of this type are: the hydrates of manganese peroxid and the so-called anhydrous artificial manganese. In favor of the latter is usually cited its high density making it possible to obtain higher yields of current, while for the former speaks their higher efficiency, due to the presence of hydroxyl which causes faster depolarization and recuperation.

I have discovered a process which makes it possible to obtain a form of manganese peroxid combining in itself the high efficiency of the hydrate with the density of the anhydrous kind. It is as follows: Manganese carbonate is subjected to the action of hot air at about 300° C. or to the action of hot air in the presence of oxids of nitrogen at a somewhat lower temperature, obtaining in this way a product containing from 70% to 80% $MnO_2$, a considerable quantity MnO, and a few per cent. of $CO_2$.

This product containing $CO_2$ bound to either bivalent or trivalent manganese possesses considerable resistance to direct further oxidation and is treated with a hot diluted solution of a caustic alkali such as sodium hydroxid which treatment removes carbonic acid and substitutes OH in its stead. The substitution of carbonic acid by OH takes place in accordance with the general behavior of salts of heavy metals toward alkalis.

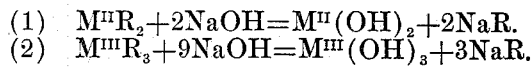

(1) $M^{II}R_2 + 2NaOH = M^{II}(OH)_2 + 2NaR.$
(2) $M^{III}R_3 + 9NaOH = M^{III}(OH)_3 + 3NaR.$

Since it is hardly possible to gage the quantity of the caustic alkali so that it corresponds exactly to the quantity of $CO_2$ present, I prefer to employ a slight excess of the alkali which I remove after completion of the reaction, by repeated decantation. In order to facilitate fast settling, an addition of salts, such as, NaCl, $NH_4Cl$, and in some cases even of $MnCl_2$ is advisable. This way of working has also the advantage of removing many impurities originally present in the raw material.

The resulting product of this treatment possesses so far very little of depolarizing powers but has now the property of being oxidized very easily and changed thereby into a powerful depolarizer of a high degree of efficiency.

I have employed various means of oxidation such as, hot air at comparatively low temperatures, as, for instance, 240° to 250° C. or solutions of various chemicals, such as, $KMnO_4$, NaClO, HClO, at temperatures ranging from 70° to 80° C. and have obtained in each case excellent materials which, after incorporating with conducting material, have yielded cells superior with respect to high current and recuperation. Instead of oxidizing the product obtained from the alkali treatment by the action of only one agent, I have found it possible to employ various agents successively, as, for example, a highly satisfactory depolarizer was attained by first treating the product of the alkali treatment with small quantities of chemical agents, such as, $KMnO_4$, NaOCl, or HOCl, and then subjecting it, in the dry state, to the action of hot air.

Naturally, with a material so easily oxidized, my invention is not limited to the above oxidizing agents as doubtlessly others can be found which will do equally well, the essential feature of this invention being the preparing of the material for oxidation by the substitution of OH for carbonic acid making thereby the material easily accessible to oxidation and imparting to it valuable properties as a depolarizer.

Among the other advantages of this process, the fact should be mentioned that even when chemical oxidizing agents have been employed by me, it has been found possible to successfully use the same in the extremely small proportion of about one part of the agent to about fifty parts of the depolarizer material.

What I claim as my invention and desire to secure by Letters-Patent, is:

1. A method of preparing an electrode material for galvanic cells comprising the subjection of manganese carbonate to the action of hot air for obtaining a product containing a large percentage of $MnO_2$, treating this product to remove therefrom the carbonic acid present, oxidizing the resulting product, and adding a conducting material.

2. A method of preparing an electrode material for galvanic cells comprising the subjection of manganese carbonate to the action of hot air for obtaining a product containing a large percentage of $MnO_2$, treating this product with a hot diluted solution of a caustic alkali, oxidizing the resulting product, and adding a conducting material.

3. A method of preparing an electrode material for galvanic cells comprising the conversion of manganese carbonate by subjecting the same to the action of a gaseous oxidizing agent, into a product containing a large percentage of $MnO_2$, treating this product with a caustic alkali, oxidizing the resulting product, and adding a conducting material.

4. A method of preparing an electrode material for galvanic cells comprising the conversion of manganese carbonate into a product containing a large percentage of $MnO_2$, a smaller percentage of $MnO$ and a still smaller percentage of $CO_2$, treating this product to remove therefrom the carbonic acid and introduce OH in its stead, oxidizing the resulting product, and adding a conducting material.

5. A method of preparing an electrode material for galvanic cells comprising the conversion of manganese carbonate into a product containing a large percentage of $MnO_2$, a smaller percentage of $MnO$ and a still smaller percentage of $CO_2$, treating this product with a hot diluted solution of a caustic alkali to remove therefrom the carbonic acid and introduce OH in its stead, oxidizing the resulting product, and adding a conducting material.

Signed at New York city, in the county of New York and State of New York, this 10th day of July, A. D. 1918.

MORDUCH L. KAPLAN.

Witnesses:
ARTHUR MARION,
CHAS. C. GILL.